(12) United States Patent
Cmich

(10) Patent No.: US 12,179,513 B2
(45) Date of Patent: Dec. 31, 2024

(54) CASTER WHEEL ASSEMBLY FOR AN OUTDOOR POWER EQUIPMENT MACHINE

(71) Applicant: MTD PRODUCTS INC, Valley City, OH (US)

(72) Inventor: Ryan Cmich, Sharon Township, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 18/341,931

(22) Filed: Jun. 27, 2023

(65) Prior Publication Data
US 2023/0339264 A1  Oct. 26, 2023

Related U.S. Application Data

(62) Division of application No. 17/313,407, filed on May 6, 2021, now Pat. No. 11,691,456.

(60) Provisional application No. 63/020,729, filed on May 6, 2020.

(51) Int. Cl.
*B60B 33/00* (2006.01)
*B60B 19/00* (2006.01)

(52) U.S. Cl.
CPC ........ *B60B 33/0028* (2013.01); *B60B 19/006* (2013.01); *B60B 33/0039* (2013.01); *B60B 33/0042* (2013.01); *B60B 2200/00* (2013.01); *B60B 2900/141* (2013.01); *B60B 2900/211* (2013.01); *B60B 2900/212* (2013.01); *B60B 2900/325* (2013.01); *B60B 2900/551* (2013.01)

(58) Field of Classification Search
CPC ............ B60B 33/0028; B60B 33/0039; B60B 33/0042; B60B 19/006; B60B 2200/00; B60B 2900/141; B60B 2900/211; B60B 2900/212; B60B 2900/325; B60B 2900/551
See application file for complete search history.

(56) References Cited

U.S. PATENT DOCUMENTS

| | | | |
|---|---|---|---|
| 1,083,115 A * | 12/1913 | Mallory | ................ B60F 3/0038 440/12.62 |
| 1,480,851 A * | 1/1924 | Baum | ................ B60B 33/0002 16/47 |
| 1,562,124 A | 11/1925 | Rautenberg | |
| 1,687,113 A | 10/1928 | Stockdale | |
| 2,096,239 A | 10/1937 | Geyer | |

(Continued)

FOREIGN PATENT DOCUMENTS

JP       2001191708 A     7/2001

OTHER PUBLICATIONS

International Search Report and Written Opinion of corresponding International Application No. PCT/US2021/031074 dated Aug. 31, 2021, 9 pages.

*Primary Examiner* — Chuck Y Mah
(74) *Attorney, Agent, or Firm* — Wegman Hessler Valore

(57) ABSTRACT

A caster wheel assembly for an outdoor power equipment machine includes a wheel mount and provides a double bell-shaped caster wheel including two bell-shaped halves, each bell-shaped half includes a central hub, a smooth transition portion, an outer circumferential rim, and a planar face. A ground contacting tread can be provided by the outer circumferential rims. A ground contacting tread can be provided by a resilient tread ring positioned between the two bell-shaped halves.

17 Claims, 24 Drawing Sheets

(56) References Cited

U.S. PATENT DOCUMENTS

| | | | |
|---|---|---|---|
| 2,448,222 A * | 8/1948 | Jones | B60B 11/06 |
| | | | 152/10 |
| 2,560,562 A * | 7/1951 | Ferwerda | B62D 7/02 |
| | | | 16/18 R |
| 2,615,193 A | 10/1952 | Klijberg | |
| 2,723,415 A | 11/1955 | Taylor et al. | |
| 2,729,843 A | 1/1956 | Seek | |
| 3,345,675 A | 10/1967 | Haydock | |
| 3,349,426 A | 10/1967 | Haydock | |
| 3,713,186 A * | 1/1973 | Cartwright | B60B 33/0028 |
| | | | 16/45 |
| 3,922,754 A * | 12/1975 | Andersen | B60B 33/0028 |
| | | | 16/18 R |
| 3,997,938 A * | 12/1976 | Pinaire | B60B 33/0042 |
| | | | 16/45 |
| 4,074,407 A | 2/1978 | Christensen | |
| 4,120,071 A * | 10/1978 | Crescenzi | B60B 33/0042 |
| | | | 16/37 |
| 4,161,803 A * | 7/1979 | Propst | B60B 33/0042 |
| | | | 16/18 A |
| D258,116 S | 2/1981 | Andrus, Jr. | |
| 4,327,462 A | 4/1982 | Eggleston | |
| 4,351,084 A | 9/1982 | Fontana | |
| 4,377,883 A * | 3/1983 | Folson | B60B 33/0042 |
| | | | 16/45 |
| 4,544,425 A | 10/1985 | Provolo | |
| 4,603,025 A | 7/1986 | Landay et al. | |
| 4,679,670 A * | 7/1987 | Wickman | A45C 5/14 |
| | | | 280/37 |
| 5,123,143 A | 6/1992 | Carmack | |
| D349,529 S | 8/1994 | Knudsen | |
| D355,464 S | 2/1995 | Wilson et al. | |
| D392,552 S | 3/1998 | Miskill | |
| D398,517 S | 9/1998 | Lee | |
| 6,256,835 B1 * | 7/2001 | Wang | B60B 33/0049 |
| | | | 16/35 R |
| 6,637,072 B2 | 10/2003 | Footitt et al. | |
| D517,632 S | 3/2006 | Chen | |
| D592,490 S | 5/2009 | Frame | |
| D600,104 S * | 9/2009 | Weber | D8/375 |
| 9,193,369 B2 | 11/2015 | Riddiford et al. | |
| D901,283 S | 11/2020 | Chen | |
| 2002/0038843 A1 | 4/2002 | Footitt et al. | |
| 2015/0121652 A1 | 5/2015 | Minato et al. | |
| 2021/0347204 A1 | 11/2021 | Cmich | |

\* cited by examiner

CASTER WHEEL ASSEMBLY FOR AN OUTDOOR POWER EQUIPMENT MACHINE

CROSS-REFERENCE TO RELATED APPLICATION

This application is a divisional of U.S. patent application Ser. No. 17/313,407, filed on May 6, 2021, which claimed the benefit of U.S. provisional application No. 63/020,729, filed on May 6, 2020, both of which are hereby incorporated by reference in their entireties.

FIELD OF THE INVENTION

The disclosed technology is generally directed to a caster wheel assembly. The disclosed technology relates to a caster wheel assembly for an outdoor power machine, and more specifically, for a caster wheel assembly providing a bell-shaped caster wheel, and a wheel mount.

BACKGROUND OF THE INVENTION

Many devices make use of caster wheels to enable rolling movement. Due to their small size and simplicity, caster wheels are well suited for traditional and autonomous mower applications, where the mower frame requires support but must also be able to follow steering inputs from the tractive wheels of the lawnmower. However, the use of caster wheels in lawnmowers often leads to unsightly and undesirable wheel marks in an area of turf traversed, and can limit functionality and/or maneuverability of the mower.

For example, a traditional caster wheel can compact or lay down areas of grass, which often occurs with robotic/autonomous mowers whose cut systems do not produce enough air movement or lift to stand grass back up that has been laid over by the wheels. Most conventional caster wheels also often require a yoke-like bracket and other adjacent structure, of which freshly cut grass and other debris can become stuck or trapped against the wheel, thus clogging up and limiting the rotation of the wheel.

Further, traditional caster-type wheels can easily become stuck in small holes, ruts, and/or by other obstacles often present in an area of turf. For example, when a traditional cylindrical wheel having a flat outer face runs alongside a vertical edge surface, or a fixed face such as a sidewalk edge, it can become stuck, thus limiting the ability of a robotic/autonomous mower to maneuver properly.

SUMMARY OF THE INVENTION

The disclosed technology generally described hereinafter provides for a caster wheel assembly. According to an aspect of the disclosed technology, a caster wheel assembly is provided. In some embodiments, the caster wheel assembly comprises a double bell-shaped caster wheel comprising two bell-shaped halves; and a wheel mount.

In some embodiments, the two bell-shaped halves are identical to one another, and are brought together to form the double bell-shaped caster wheel.

In some embodiments, the caster wheel provides for a small outer diameter, and a larger outer diameter. In some embodiments, the smaller diameter is between about 15 mm and 50 mm, and the larger outer diameter is between about 80 mm to about 150 mm.

In some embodiments, the caster wheel further comprises a center tread portion. In some embodiments, the center tread portion is about 10 mm to about 40 mm in width. In some embodiments, the center tread portion further comprises a rubber tread ring, wherein the bell-shaped halves are brought together to entrap the rubber tread ring.

In some embodiments, the caster wheel further comprises a double curvature having a smooth transition provided by the two bell-shaped halves. In some embodiments, the double curvature begins at and is adjacent to the center tread ring, wherein the wheel decreases in diameter as it moves away from the center tread ring portion.

In some embodiments, the wheel mount comprises a wheel spindle and a bracket. In some embodiments, the wheel spindle comprises an elongate end, a curved portion, and an elongate horizontal portion. In some embodiments, the elongate horizontal portion passes through the center of the caster wheel.

In some embodiments, the bracket is generally curved, extending from the elongate horizontal portion, and arcs around the wheel to meet the elongate end of the wheel spindle. In some embodiments, the bracket provides a hooked end, wherein the hooked end hooks over and around the wheel spindle.

In some embodiments, the caster wheel comprises at least two magnets positioned between the two bell-shaped halves. In some embodiments, the magnets are offset from each other. In some embodiments, the caster wheel comprises four magnets positioned between the two bell-shaped halves, and arranged equidistant around the outer circumference of the bell-shaped halves. In some embodiments, each of the four magnets are orientated at 90° relative to an adjacent magnet.

According to other aspects of the disclosed technology, the caster wheel assembly comprises a wheel comprising two bell-shaped halves; and a wheel mount, wherein the mount is positioned in between the two-bell shaped halves.

In some embodiments, each bell-shaped half comprises a central hub, a smooth transition portion, an outer circumferential rim, and a planar face. In some embodiments, the smooth transition portion transitions radially outward from the central hub toward the outer circumferential rim. In some embodiments, the smooth transition portion further comprises a ground contacting portion positioned adjacent to the outer circumferential rim.

In some embodiments, the ground contacting portion is about 5 mm to about 20 mm in width. In some embodiments, the bell-shaped halves are positioned such that each planar face is directly opposed to each other.

In some embodiments, the wheel mount further comprises a spindle, a mount body, and an axle. In some embodiments, the mount body comprises an elongate aperture for receiving the spindle, and a second aperture for receiving the axle. In some embodiments, the elongate aperture and the second aperture are offset from one another. In some embodiments, the mount body comprises an elongate top portion and a rounded bottom portion.

In some embodiments, the caster wheel assembly further comprises a first magnet pair and a second magnet pair. In some embodiments, the first magnet pair and the second magnet pair are offset from each other. In some embodiments, the first magnet pair comprises two individual magnets that are positioned 180° from each other. In some embodiments, the second magnet pair comprises two individual magnets that are positioned 180° from each other.

BRIEF DESCRIPTION OF SEVERAL VIEWS OF THE DRAWINGS

These and other features of the disclosed technology, and the advantages, are illustrated specifically in embodiments now to be described, by way of example, with reference to the accompanying diagrammatic drawings, in which.

Figure 1A:
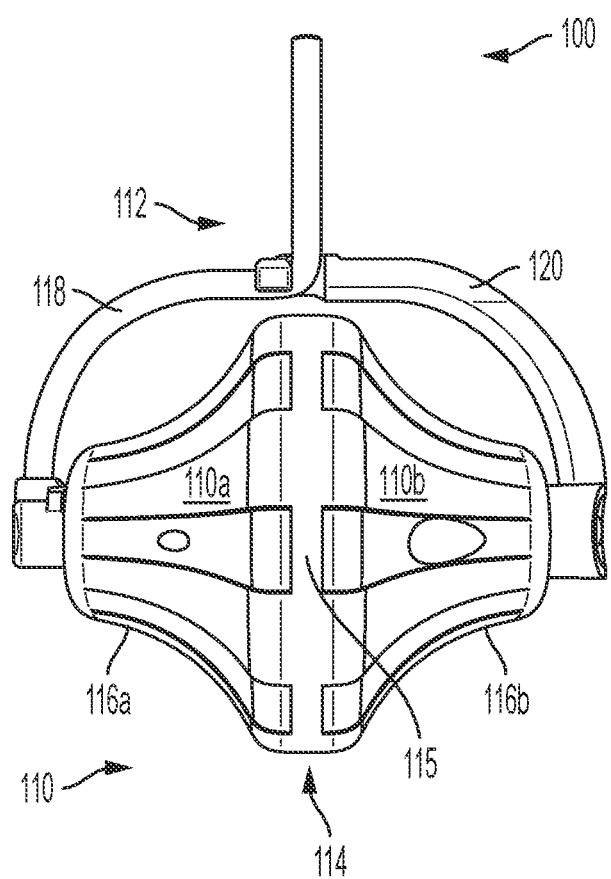
FIGS. 1A-1G illustrate an example caster wheel assembly for an outdoor power equipment machine, according to aspects of the disclosed technology.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION OF THE EMBODIMENTS

The following terms are used throughout the description, the definitions of which are provided herein to assist in understanding various aspects of the subject disclosure.

As used herein, the terms "wheel" and "caster wheel" are used interchangeably and refer to most any wheel.

As used herein, the terms "mower", "robot mower", "robotic mower", "autonomous mower", and "outdoor power equipment machine" are used interchangeably and refer to most any mower, or other lawn and garden equipment.

As used herein, the terms "turf", "turf material", and "material" are used interchangeably and refer to most any type of grass or turf, soil and the grass/plant material contained therein.

The disclosed technology generally described hereinafter provides for a caster wheel assembly and a bell-shaped caster wheel for use with an autonomous mower. The specific shape of the caster wheel provides for the ability of the wheel to climb out of small holes, ruts, and/or other obstacles. With existing products, and contrast to the disclosed technology, a conventional narrow wheel (without such bell shape) can cause maneuverability issues, such as getting trapped in small holes/obstacles.

Figure 1B:
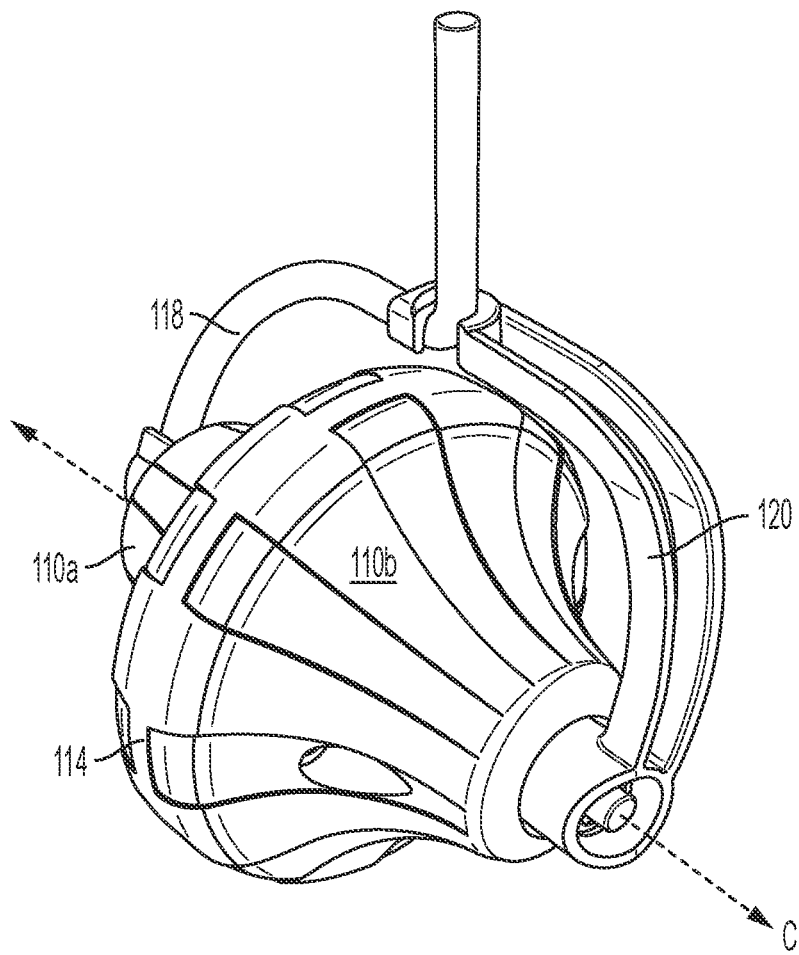

In an embodiment, with reference to FIGS. 1A-G, a caster wheel assembly 100 is shown. The caster wheel assembly 100 includes a pivotable wheel mount 112 coupled to a caster wheel 110. Wheel mount 112 is rotatably connected to a frame or chassis of an autonomous mower. The wheel mount 112 comprises a wheel spindle 118 and a bracket 120. In an embodiment, the wheel spindle 118 comprises a wire form member. The wheel spindle 118 is shown as a single spindle which curves around the side of the caster wheel 110. As illustrated in FIG. 1B, a portion of the wheel spindle 118 passes through the center axis C of the caster wheel 110, and thus acts as the axle about which the wheel 110 rotates.

In some embodiments, the caster wheel 110 is a double bell-shaped wheel comprising two bell-shaped halves 110a, 110b, which are brought together to form the double-bell shaped wheel. In an embodiment, the two bell-shaped halves 110a, 110b are identical.

The caster wheel 110 further comprises a center tread portion 114. The center tread portion 114 provides a limited surface area, or relatively narrow portion of the caster wheel 110 which contacts the ground. The center tread portion 114 allows for a reduced footprint, where the wheel 110 reduces the compaction of the grass, reduces disruption of the turf, and/or reduces the amount of grass that is being laid down in front of the cut system. This becomes particularly important for robotic/autonomous mowers whose cut systems do not generally produce significant air movement for lifting and standing the grass back up that has been laid over by the wheels.

In some embodiments, the center tread portion 114 is about 10 mm-40 mm in width. It should be understood that the center tread portion 114 can be of most any width sufficient to support the weight of the mower and/or maintain a specific amount of pressure imposed on the grass/turf.

Figure 1C:
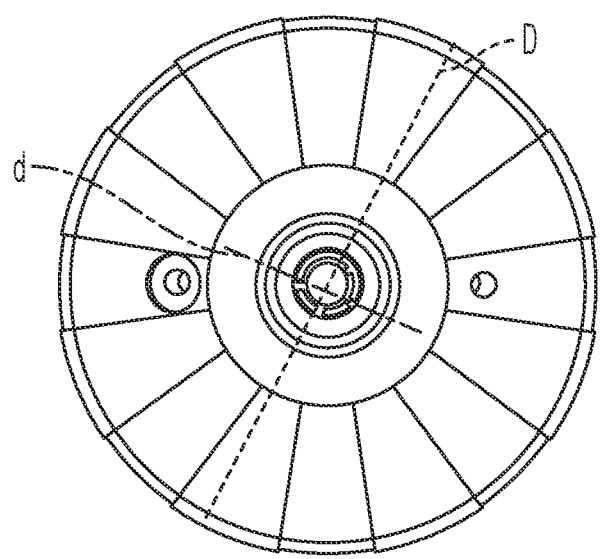
Figure 1D:
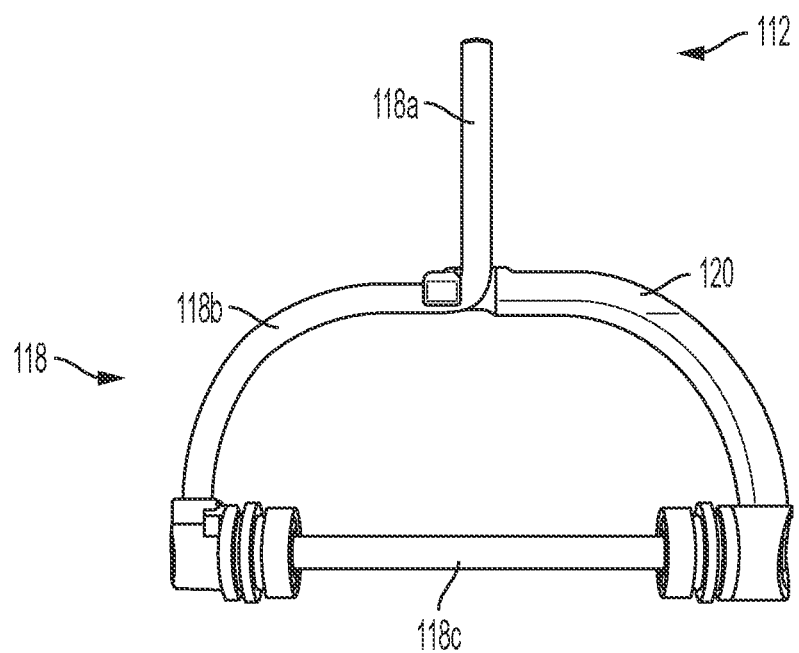
Figure 1E:
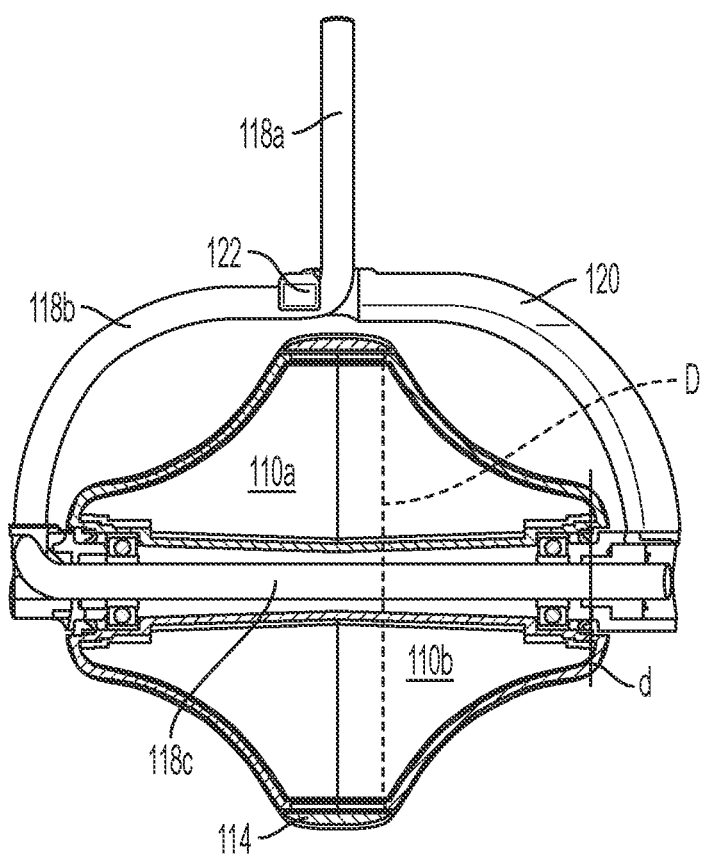
Figure 1F:
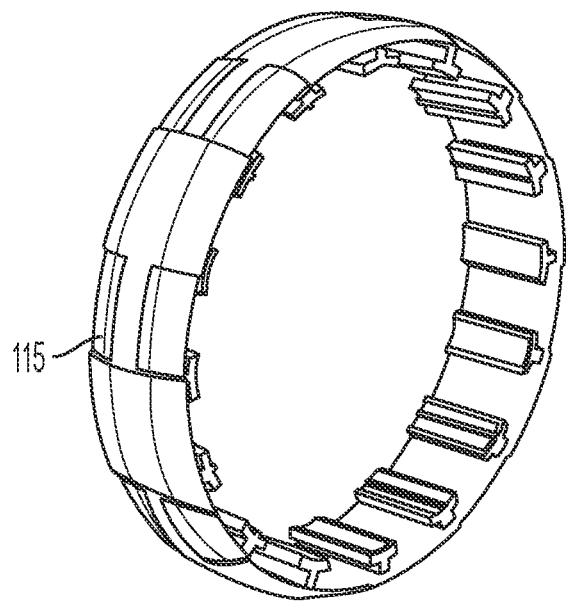
Figure 1G:
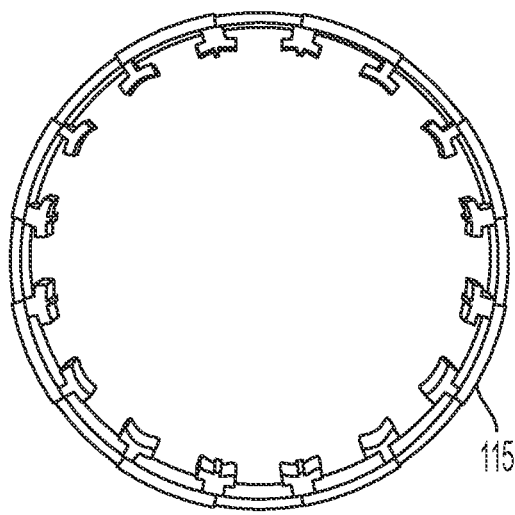

Referring to FIGS. 1F-1G, in some embodiments, the center tread portion 114 comprises a resilient rubber tread ring 115. In some embodiments, the bell-shaped halves 110a, 110b are brought together to entrap the rubber tread ring 115, such that the bell-shaped halves 110a, 110b trap the rubber tread ring 115 between them. It should be understood that the rubber tread ring 115 can be made of most any resilient, rubber material or rubber-like material, and sized to provide an installation stretch, where the rubber material serves to seal the two bell-shaped halves 110a, 110b, thus keeping water and other debris from entering an interior portion of the caster wheel 110. This helps prevent the addition of weight to the wheel, and prevents corrosion and damage to the interior components of the wheel (e.g., magnets, bearings, or the like).

The rubber tread ring 115 provides a soft contact area and a quiet and non-skidding surface on pavement or other hard surfaces. The rubber tread ring 115 also provides better grip on hard surfaces so that encoding is more accurate. For example, debris build-up is present and resists rotation of the wheel, the rubber tread ring 115 provides substantial grip on hard surfaces to overcome the resistance.

Further, the rubber tread ring 115 ensures that there is not a radially exposed opening, seam, or joint that is being pressed against the ground during rotation of the caster wheel 110. Traditional wheels having two halves that are joined generally have a circumferential groove in the middle through which soil is squeezed or pressed as the wheel rolls across the soil surface, and over time, the wheel can become filled or packed with mud. This phenomenon adds weight to the traditional wheel, and promotes corrosion as moisture is introduced to the interior of the wheel. The seams associated with the rubber tread ring 115 of the present technology are positioned such that they are not pressed against the ground during operation of the wheel thus eliminating the opportunity for dirt/soil to enter and deteriorate the interior portion of the wheel.

The caster wheel 110 further comprises a double curvature 116a, 116b. The double curvature 116a, 116b comprises a smooth transition provided by the two bell-shaped halves 110a, 110b.

As shown in FIGS. 1A-1B, the double curvature 116a, 116b begins at and is adjacent to the center tread ring 115, where the wheel decreases in diameter as it gets wider (i.e. as it moves away from the center tread ring portion 115). The double curvature 116a, 116b or the arc of the double bell shape can be determined by an optimization of the diameter of the center portion and the diameter of the outer portions of the caster wheel 110.

The double curvature 116a, 116b allows the caster wheel 110 to rotate out and pivot in order to climb over an obstacle, a sidewalk edge, or otherwise free itself from a fixed vertical edge. In contrast, for example, when a traditional cylindrical wheel having flat faces runs alongside a vertical edge surface, or a fixed face such as a sidewalk edge, it can become stuck. That is, the flat face of a conventional wheel tends to become trapped and travels parallel to a vertical surface of an obstruction, and can require a significant amount of force to break free. The force required for a traditional wheel to rotate away from the obstacle is much greater since there is no moment arm between the wheel edge and the wheel swivel to axis. The moment arm determines the degree of effectiveness or influence of a force to produce rotation of the wheel around an axis, where the moment arm is the shortest distance from the line of force to the axis. Geometrically, it is the perpendicular distance from the line of force to the axis, i.e. it is perpendicular to the line of force.

Therefore, the bell shape of the present technology prevents the wheel from squaring up against a flat side wall of an obstacle or obstruction and becoming trapped. The double curvature 116a, 116b allows the wheel to contact an obstacle towards the middle of the smooth transition, thus providing a large enough moment arm so that the wheel is easily rotated engaging the outer circumference of the wheel, which can easily climb up the edge of the obstacle.

For example, if the caster wheel drops into a hole, the double curvature 116a, 116b provides a much wider footprint to prevent the wheel 110 from becoming stuck, or to climb out of the hole. Thus, the caster wheel is less susceptible to falling into smaller holes, and less likely to become stuck or trapped in a larger hole. In an embodiment, the height from the inner (i.e. smaller) radius of the caster wheel 110 to the ground surface is a function of how much drop the mower is able to sustain before another portion of the mower body, for example, the mower chassis or the mower body structure, contacts the ground.

In some embodiments, the caster wheel 110 provides for a relatively small diameter, d, at the outside edges of the wheel 110, and a larger diameter, D (as shown in FIGS. 1C and 1E) at the inner edge of the wheel halves 110a, 110b, or the middle portion of the wheel 110. The diameters D and d can be tuned for various performance goals. For example, to prevent false obstructions (e.g., the autonomous mower sensor system detects a lift or bump condition when the mower encounters a small hole), a larger diameter D is desired. To detect large holes quickly, a smaller diameter d is desired to allow for a moveable body structure to detect the fall off of the caster wheel 110, yet still keeping the mower chassis from making hard contact with the ground.

It should be understood that the smaller diameter d at the ends of the bell shape can be dictated by the height of the turf to remain undisturbed. In some embodiments, the smaller diameter d can be at least 30 mm, or between about 15 mm and 50 mm. In some embodiments, the larger diameter D is about 80 mm to about 150 mm.

The smaller diameter d provides a climbing "lead in" feature when trying to turn away from a vertical edge surface (e.g. a sidewalk edge, or hole) as discussed above. However, the smaller outer diameter d should not be so small that the caster wheel 110 could drop down into smaller holes or ruts. In an embodiment, the distance from the bottom of the small diameter portion to the ground is no larger than the height of the adjacent fixed chassis areas or frame of the mower to the ground. This is so that neither the mower chassis nor the mower body/shell bottoms out before the smaller diameter wheel portions make contact with the edges of the hole. For example, such bottoming out of the chassis could cause the mower to become stuck, and bottoming out of the mower shell/body could cause a lift event to be detected Turning now to FIGS. 1A-1E, the caster wheel assembly 100 further provides a wheel mount 112. The wheel mount 112 comprises a wheel spindle 118 and a bracket 120. The caster wheel 110 can be attached to the wheel mount 112 using the combination of the wheel spindle 118 and the bracket 120.

The wheel spindle 118 acts as the swivel axis, and the rotational axis of the wheel 110. As best shown in FIGS. 1D-1E, the wheel spindle 118 comprises an elongate end 118a (which extends in the vertical direction), a curved portion 118b (curving around the wheel 110), and an elongate horizontal portion 118c. The elongate horizontal portion 118c passes through the center axis C of the caster wheel 110, and thus acts as the axle about which the wheel rotates.

The elongate end 118a provides the swivel axis and is rotatably mounted to a movable structure, such as, but not limited to, a deck of a mower or mower chassis. The wheel spindle 118 may be secured by any suitable means to the mower chassis, mower frame, or its components. In an embodiment, the wheel spindle 118 comprises a wire form member.

The wheel spindle 118 is secured to the caster wheel 110 by the bracket 120. The combination/arrangement of the wheel spindle 118 and the bracket 120 provides the benefits of a full clevis arrangement at a lower cost compared to a conventionally fabricated clevis, and eliminates the need for a metal clip when the bracket 120 is formed of a plastic material.

In some embodiments, the bracket 120 is generally curved, wherein one end is connected to and extends from the end of the elongate horizontal portion 118c, and arcs around the wheel to meet the elongate end 118a of wheel spindle 118. Generally, the bracket 120 is fully constrained, for example, but not limited to, a cylindrical engagement with the horizontal axis and a cylindrical engagement of the vertical axis through the hook around. In some embodiments, translation of the horizontal end can optionally be restricted with the addition of a retaining ring In some embodiments, the bracket 120 provides a hooked end 122, where the hooked end 122 hooks over and around the wheel spindle 118, such that it comes down and traps the other side of the wheel. In some embodiments, the bracket 120 can be implemented in most any material with the strength and durability to provide support to wheel spindle 118 and the caster wheel 110 including plastic or metal.

Further, the combination of the wheel spindle 118 and the bracket 120 prevents the "spaghetti fork" effect experienced with traditional single-sided wire forms, where taller, stringy grass gets wrapped around the wire form and eventually binds up the rotation of the wheel. The hooked end 122 reaches around and closes off the opposing side thereby preventing any stringy material from being able to get in and wrap in that manner.

Figure 2A:
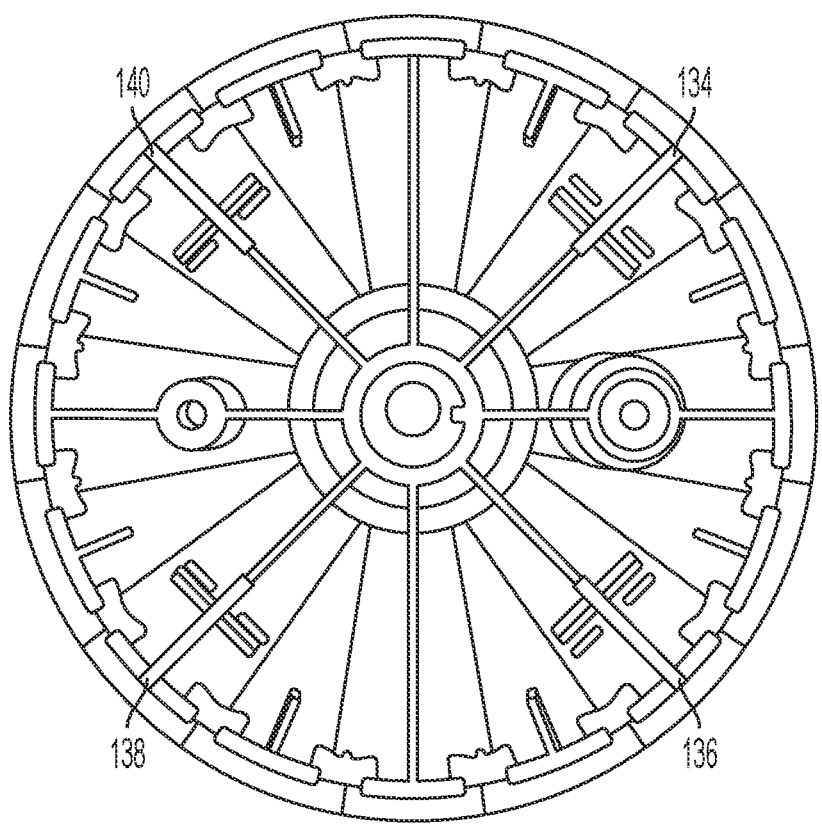
FIGS. 2A-2B illustrate an example caster wheel assembly for an outdoor power equipment machine, according to aspects of the disclosed technology.
Figure 2B:
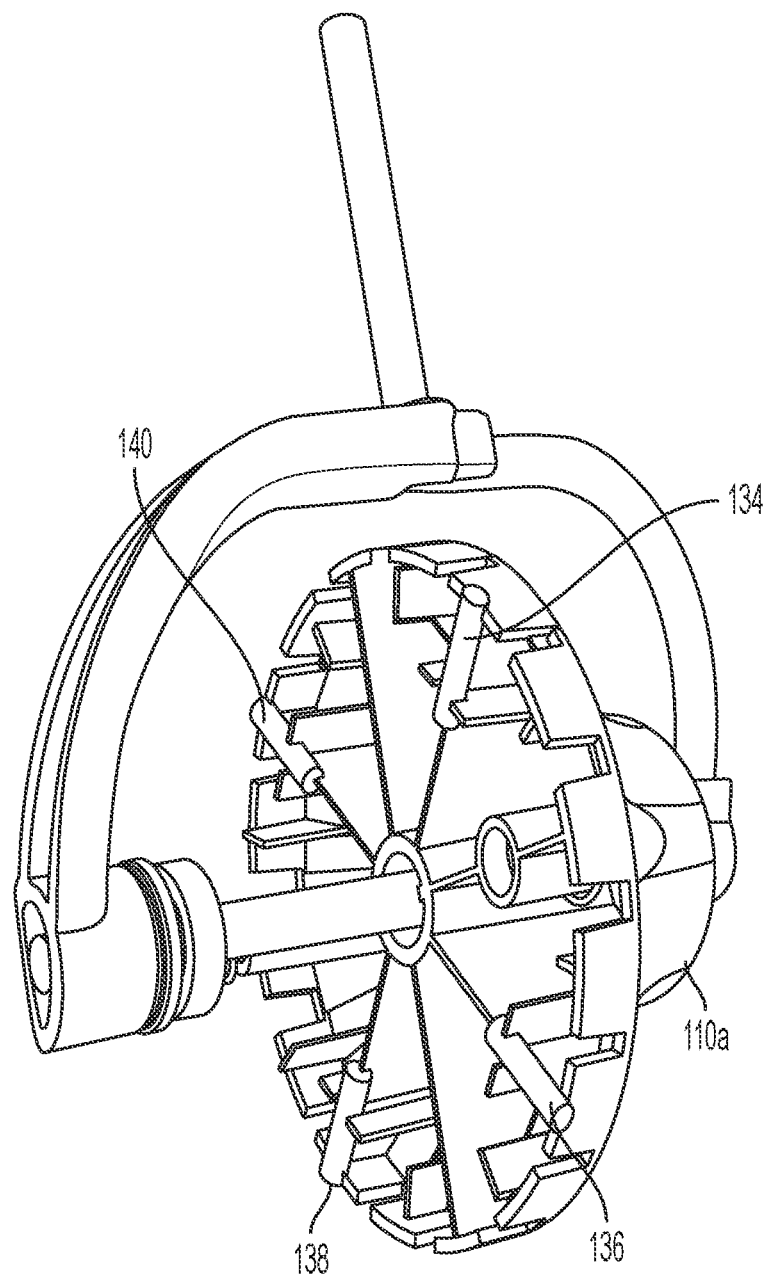

Now turning to FIGS. 2A-2B, in some embodiments, the caster wheel assembly 100 provides for magnets 134, 136, 138, and 140, located partially within and between the bell-shaped halves 110a, 110b. In some embodiments, the magnets 134, 136, 138, and 140 are arranged equidistant around the outer circumference of the bell-shaped halves 110a, 110b, and oriented at 90 degrees relative to an adjacent magnet 134, 136, 138, and 140.

In an embodiment, a position encoder associated with the caster wheel assembly 100 is arranged to measure the movement, rotation, velocity or displacement of the caster wheel 110. The magnetic sensing device may comprise a magnetic field sensor (e.g., Hall effect sensor), a magneto-resistive sensor or another sensor that can sense or measure movement of the caster wheel 110. As described above in detail in connection with a first embodiment, the position encoder can also provide information for determining that the caster wheel 110 is stationary, or rotating at an unexpectedly increased or decreased speed, indicating that the mower is stuck.

In some embodiments, the magnets 134, 136, 138, and 140 are securely fastened or entrapped between the bell-shaped halves 110a, 110b, and are positioned within the caster wheel 110, and beneath the rubber tread ring 115.

The magnets 134, 136, 138, and 140 provide the autonomous mower with the ability to sense the rotation, or lack thereof, of the caster wheel 110. The sensor for encoding (not shown in the figures) can be located within the chassis or mower frame, and is configured to interact with and recognize the placement of magnets 134, 136, 138, and 140 during rotation of the caster wheel 110.

Figure 3A:
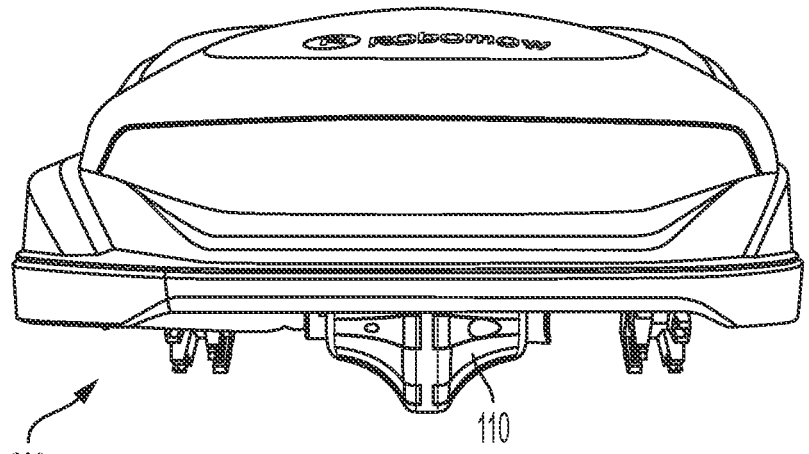
FIGS. 3A-3B illustrate an example caster wheel assembly and an outdoor power equipment machine, according to aspects of the disclosed technology.
Figure 3B:
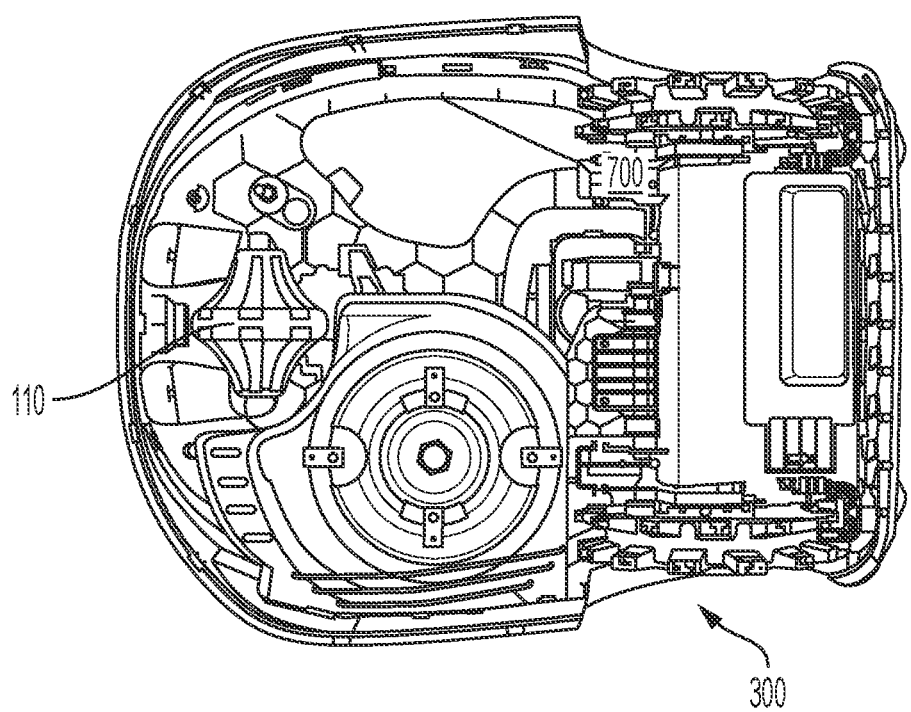

With reference to FIGS. 3A-3B, an example autonomous mower 300 is provided with a caster wheel assembly 110 arranged to support the front end of the mower 300. In one example, the autonomous mower 300 can be powered by at least one powered wheel located at the rear of the autonomous mower 300, while the caster wheel assembly 100 is not powered and rotates freely according to the movements of the powered wheel(s).

Figure 4A:
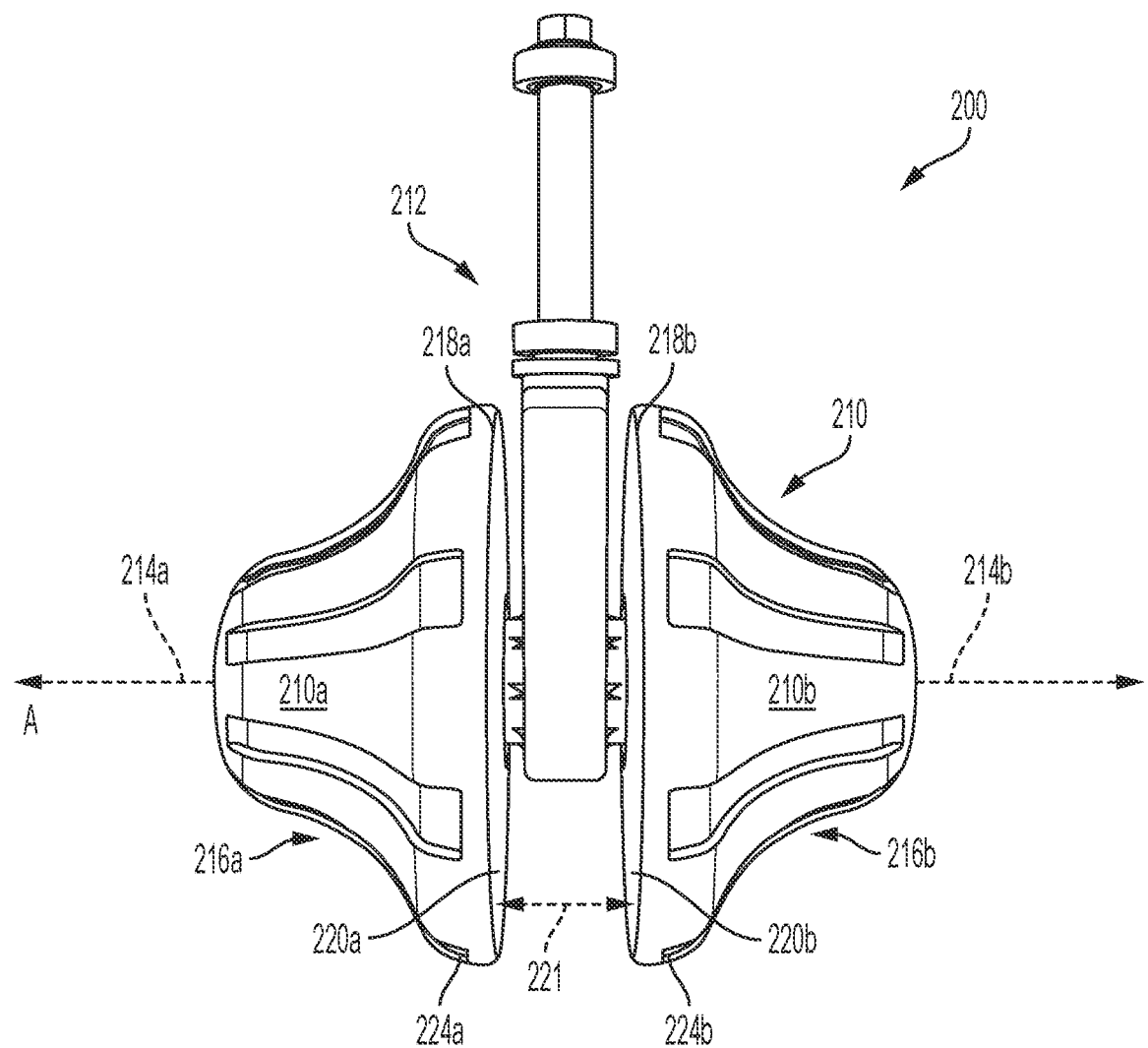
FIGS. 4A-4D illustrate an example caster wheel assembly for an outdoor power equipment machine, according to aspects of the disclosed technology.
Figure 4B:
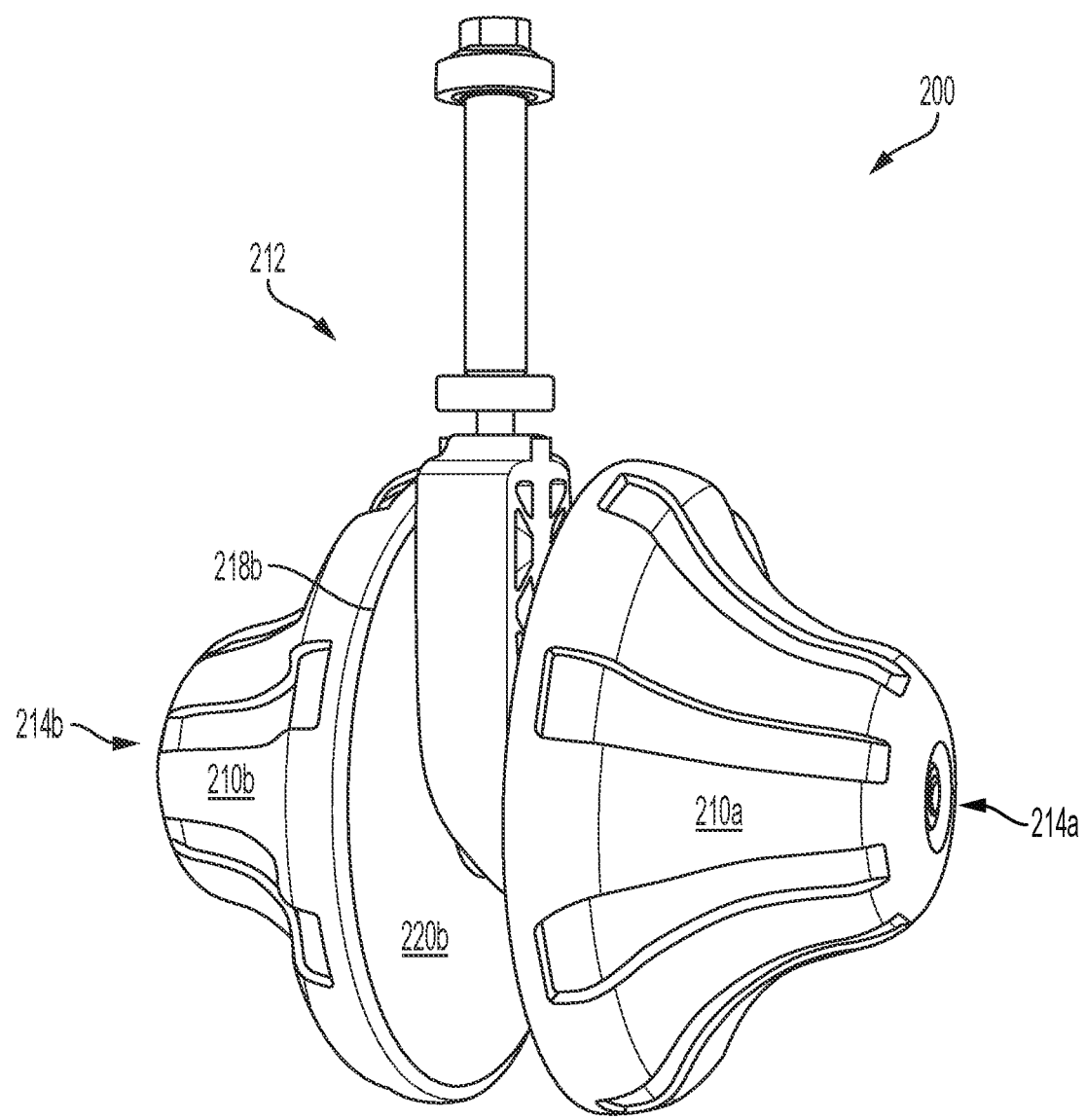
Figure 4C:
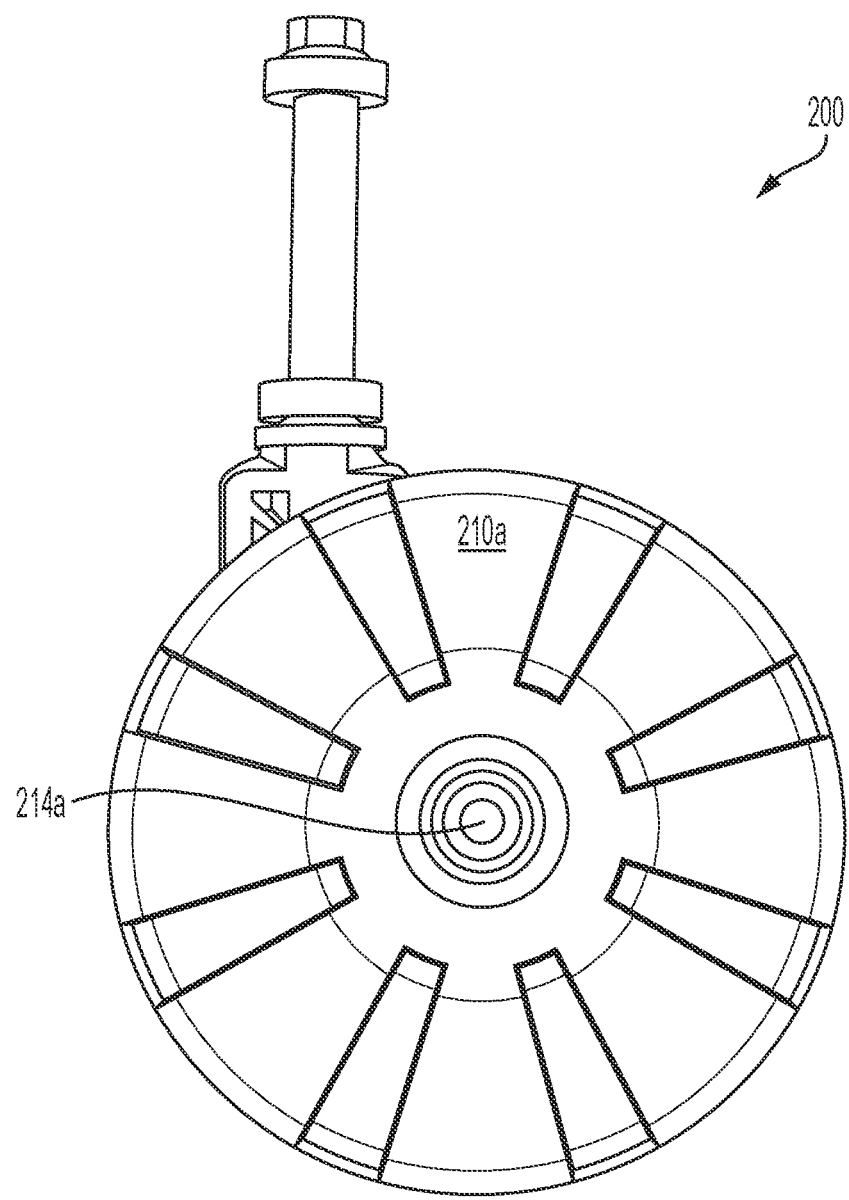

Referring to FIGS. 4A-C, a caster wheel assembly 200 is shown. The caster wheel assembly 200 comprises a caster wheel 210 and a wheel mount 212. The wheel mount 212 is rotatably connected to a frame or chassis of an outdoor power equipment machine, for example, an autonomous mower.

In some embodiments, the caster wheel 210 comprises two bell-shaped halves 210a, 210b, thus providing a "split wheel" configuration. This "split wheel" configuration allows for the wheel to pass through grass or turf while minimizing the flattening, compressing or compacting of the grass or turf as the mower rolls across the ground.

It should be understood that the two bell-shaped halves 210a, 210b can be made of or formed from most any material sufficient to be rigid enough to provide support to the robotic mower, while also being substantially lightweight.

In some embodiments, the two bell-shaped halves 210a, 210b are made of plastic, metal, or rubber. In some embodiments, each bell-shaped half 210a, 210b has a diameter of about 110 mm. It should be understood that the outer diameter of the caster wheel is a function of the physical space available within the chassis and enclosing structure of the machine. It should generally be as large as possible in order to provide for the greatest maneuverability on rough terrain. At a minimum, its radius should be greater than the height from ground of forward bumper or guarding. This is to prevent obstructions that could pass below the bumper from contacting the wheel at is center height which would prevent it from rolling over said obstacle Each bell-shaped half 210a, 210b comprises, respectively, a central hub 214a, 214b, a smooth transition portion 216a, 216b, an outer circumferential rim 218a, 218b, and a planar face 220a, 220b.

Figure 4D:
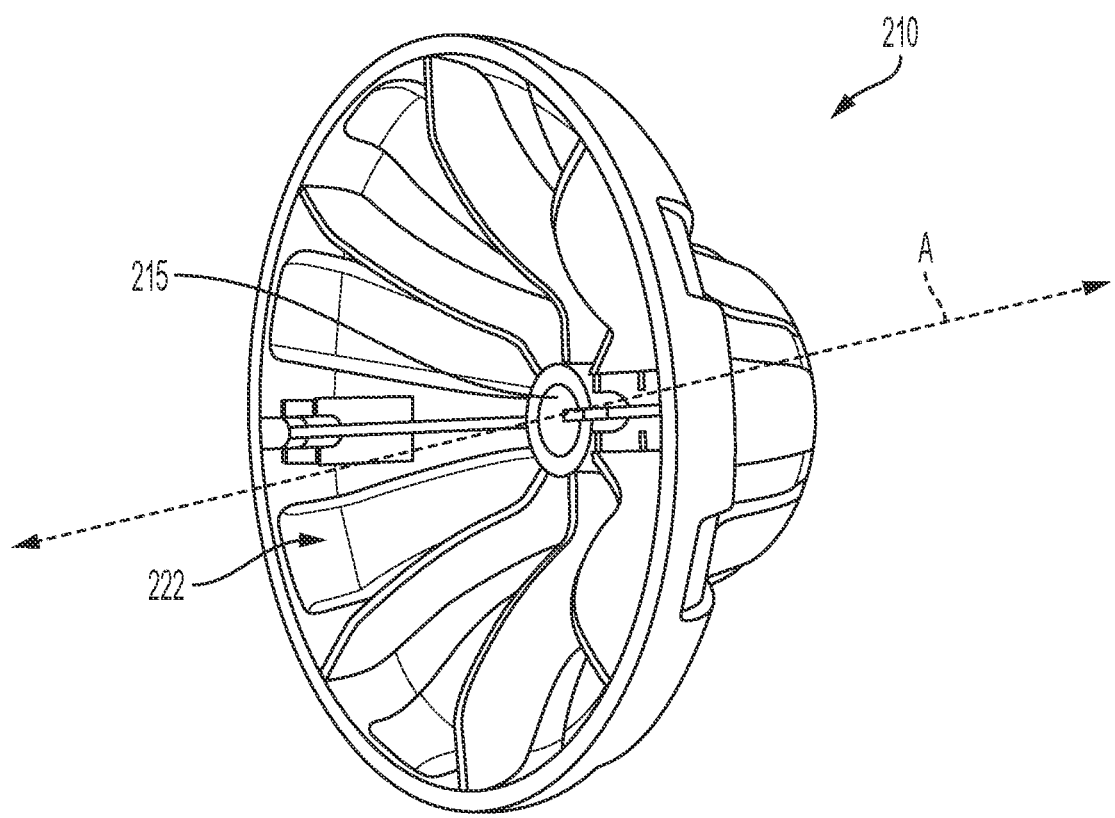

In some embodiments, the central hub 214a, 214b further comprises an aperture 215 (as best seen in FIG. 4D), wherein the aperture 215 is configured for receiving a fastener and operatively connects each bell-shaped half 210a, 210b to the wheel mount 212.

As shown in FIGS. 4A-4B, the smooth transition portion 216a, 216b of the bell shape smoothly transitions radially outward from the central hub 214a, 214b toward the outer circumferential rim 218a, 218b. In other words, the diameter of each bell-shaped half becomes larger as it extends inward from the hub 214a, 214b to the outer circumferential rim 218a, 218b.

With reference to FIGS. 4A-4B, the smooth transition portion 216a, 216b further comprises a ground contacting portion 224a, 224b positioned adjacent to the outer circumferential rim 218a, 218b. The ground contacting portion 224a, 224b together with the space 221 therebetween, provides a limited surface area, or narrow portion of which the caster wheel contacts the ground, which allows for the wheel to easily slip through and between the grass or turf to minimize the influence of the wheels (i.e. to prevent crushing, flattening, breakage, etc.) on the grass stems and/or area of turf. Thus, turf damage is reduced and ultimately wheel marks indicative of the traveling path of a robotic mower caused during operation are also prevented, or greatly reduced.

The reduced contact area allows the caster to slip through the grass and make contact with the soil below. This provides for a more predictable vertical height relationship of the caster wheel 210 with the ground, and therefore the chassis and cut system of the mower with the ground, which is important for maintaining optimum performance of the mower's cut system, in contrast to a wheel with a large contact area which may tend to "float" up on the grass in an inconsistent manner.

In some embodiments, the ground contacting portion 224a, 224b is about 5 mm-20 mm in width. It should be understood that the ground contacting portion 224a, 224b can be of most any width sufficient to support the weight of the mower and/or maintain a specific amount of pressure imposed on the grass/turf.

In some embodiments, the bell-shaped halves 210a, 210b are positioned adjacent to each other such that the planar faces 220a, 220b are directly opposed to each other, and where the bell-shaped halves 210a, 210b are positioned along a central axis, A, wherein central axis A extends in a horizontal direction. In some embodiments, the bell-shaped halves 210a, 210b are generally hollow, thus providing an interior cavity 222, (as best shown in FIG. 4D). In some embodiments, the interior cavity 222 is shaped to receive a mounting disc 223.

Figure 5A:
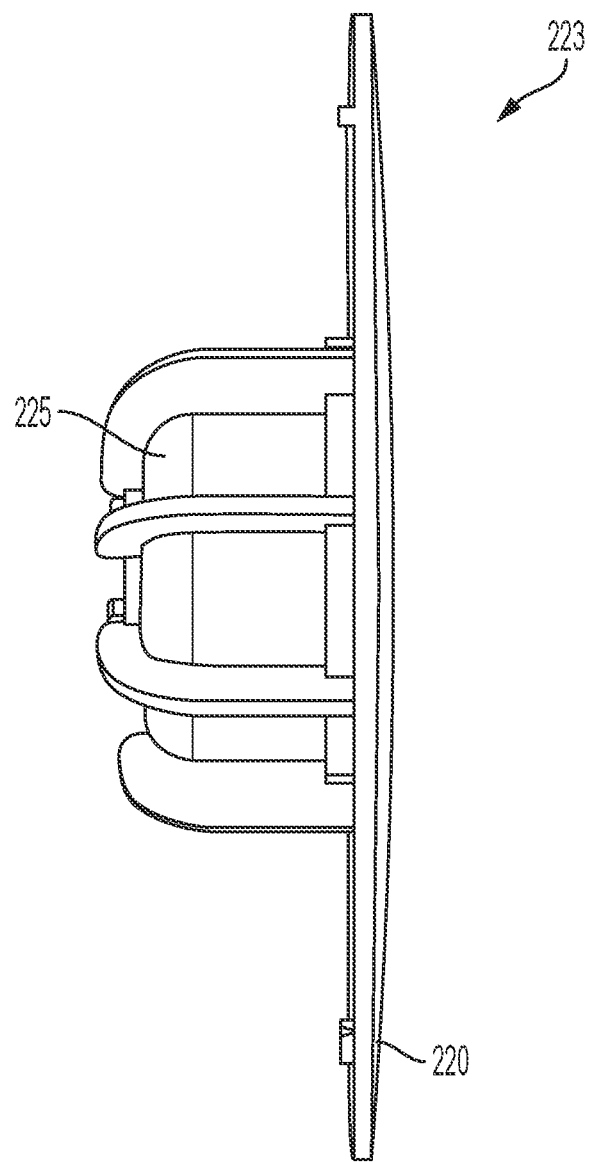
FIGS. 5A-5C illustrate an example caster wheel assembly for an outdoor power equipment machine, according to aspects of the disclosed technology.
Figure 5B:
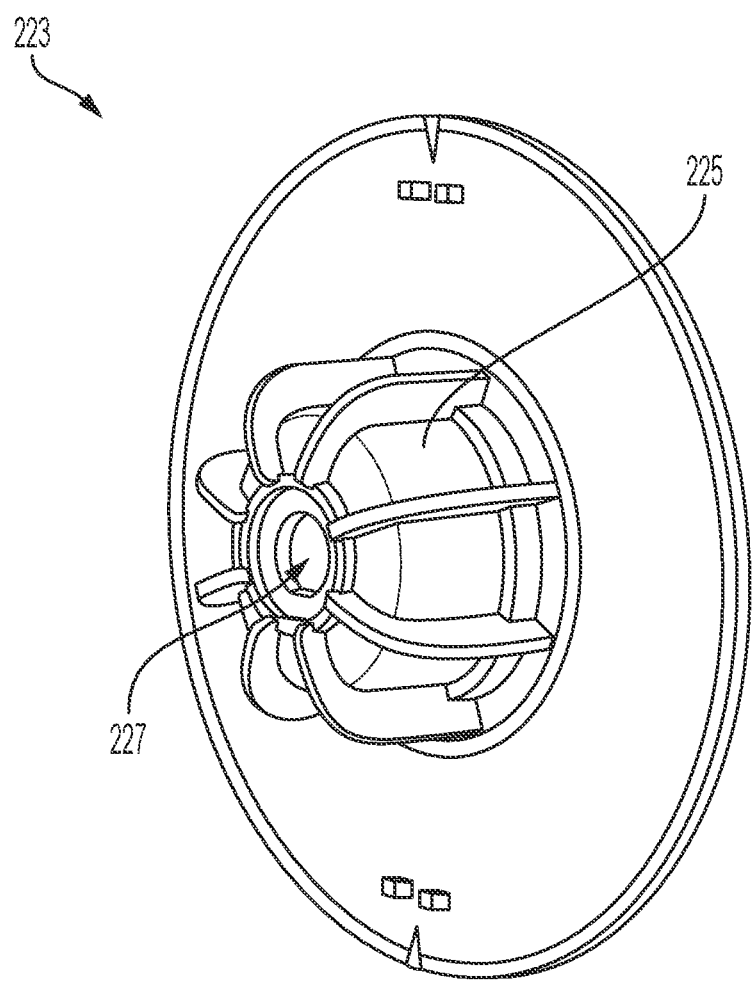
Figure 5C:
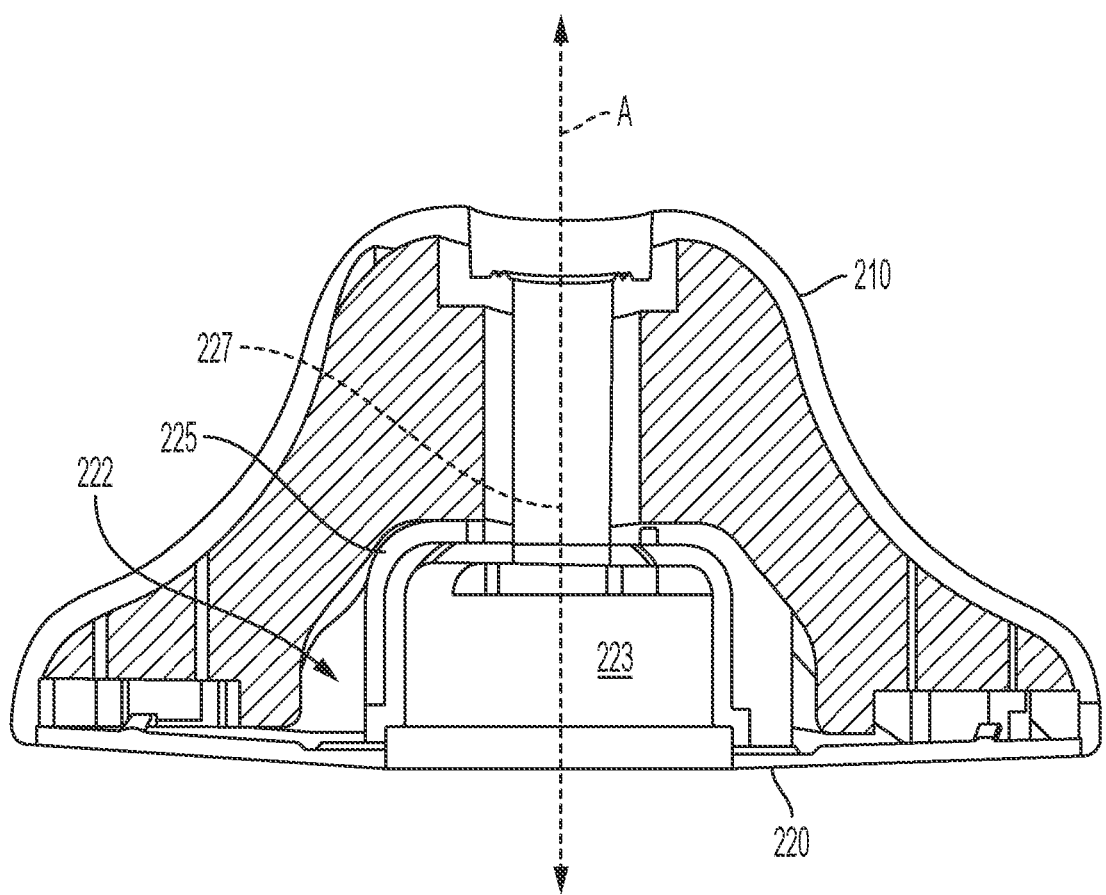

As shown in FIGS. 5A-5C, the mounting disc 223 is shaped to be positioned within and adjacent to the interior cavity 222 of each bell-shaped half 210a, 210b. The mounting disc 223 further comprises a projection 225 and where the exterior portion of the mounting disc provides the planar face 220. As best shown in FIG. 5C, when the mounting disc 223 is installed, the projection 225 is fully received and encompassed by the interior cavity 222. The mounting disc 223 comprises an aperture 227, which aligns with the central axis A. In some embodiments, the mounting disc 223 is secured to the bell-shaped half by a low friction seal, or other sealing means.

With reference to FIGS. 6A-6D, the caster wheel assembly 200 provides a wheel mount 212. In some embodiments, the wheel mount 212 is center mounted, or positioned in between the two-bell shaped halves 210a, 210b, (best shown in FIG. 4A). The center mounted wheel mount 212 eliminates any adjacent structure that would allow for debris to become stuck or trapped against the wheel. In contrast, with conventional wheel with a yoke-style bracket, mud and other debris can easily become trapped in the yoke, which builds up and around the wheel, thus limiting wheel rotation, and eventually seizing up the wheel and preventing movement completely.

Figure 6A:
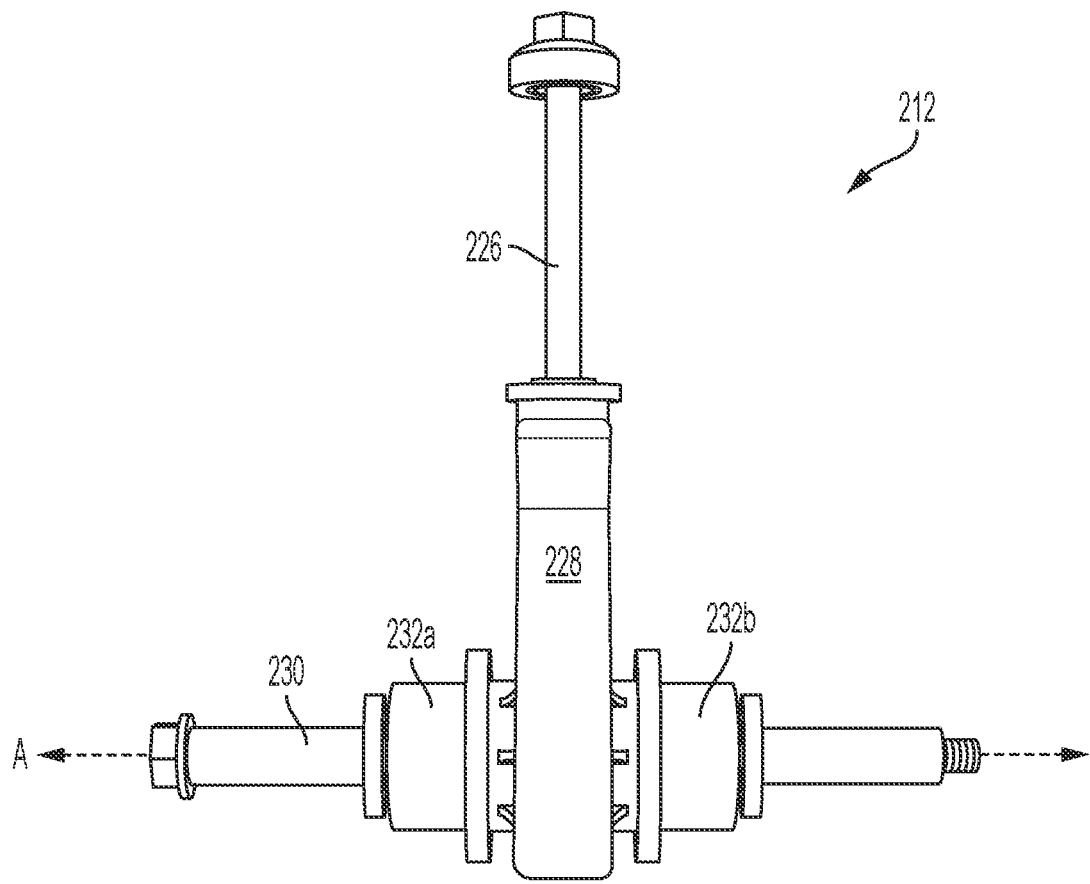
FIGS. 6A-6E illustrate an example caster wheel assembly for an outdoor power equipment machine, according to aspects of the disclosed technology.
Figure 6B:
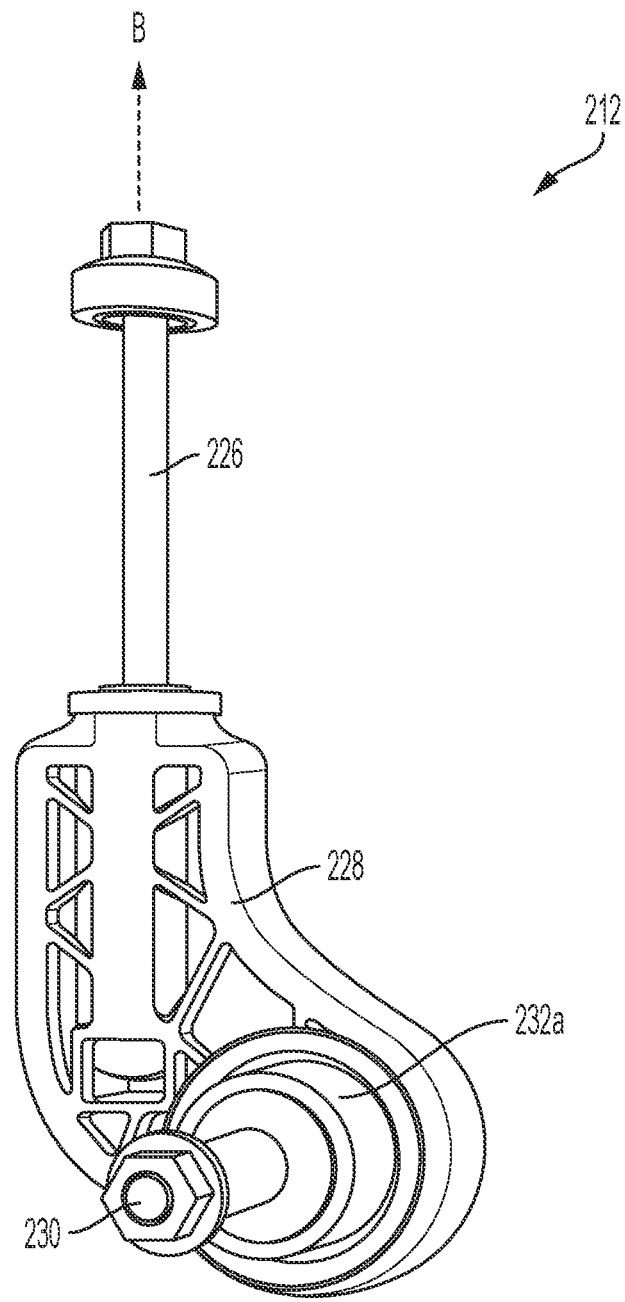

In some embodiments, the wheel mount 212 further comprises a spindle 226, a mount body 228 positioned between the bell-shaped halves 210a and 210b, and an axle 230. The spindle 226 provides for rotatably mounting the caster wheel assembly 200 to a movable structure, such as, but not limited to, a mower deck or chassis. In some embodiments, the spindle 226 defines an axis of rotation B, which extends in the vertical direction (as best seen in FIG. 6B). The spindle 226 may be secured by any suitable means to the mower chassis, mower frame, or its components. In some embodiments, the spindle 226 is secured to the mower by a swivel joint which allows the caster wheel 210 to freely rotate 360°, and enabling the wheel to roll in most any direction.

The wheel mount 212 further provides for an axle 230. The two-bell shaped halves 210a, 210b are rotatably mounted to the axle 230, such that the two-bell shaped halves 210a, 210b rotate about the central axis A. In some embodiments, the axle 230 provides threaded ends to enable the mounting of the two-bell shaped halves 210a, 210b (best seen in FIG. 6E).

Figure 6C:
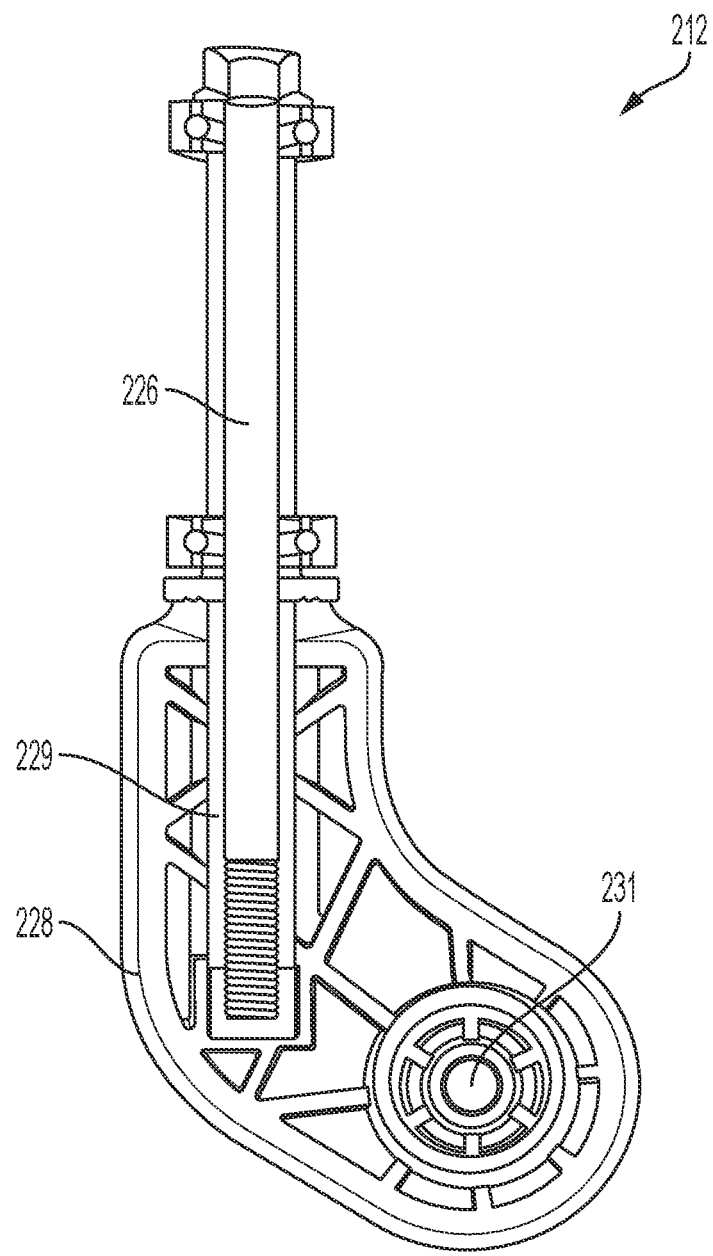
Figure 6D:
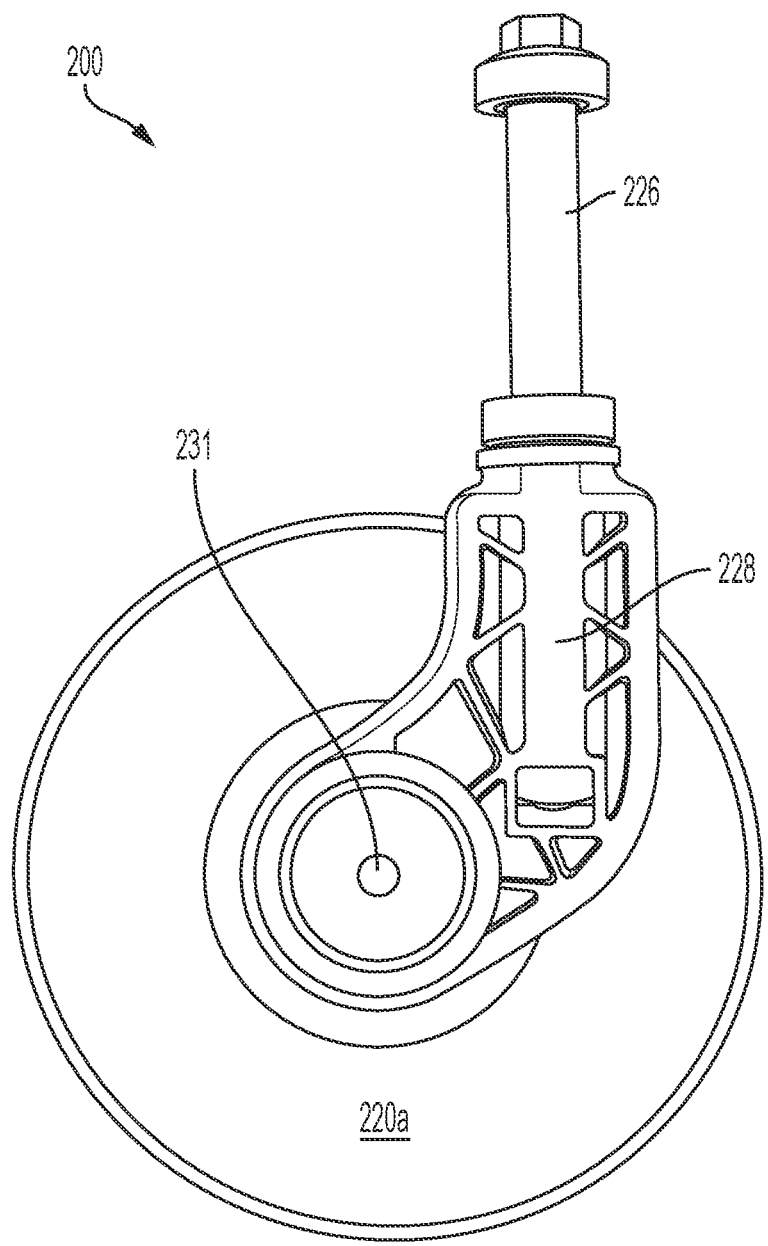
Figure 6E:
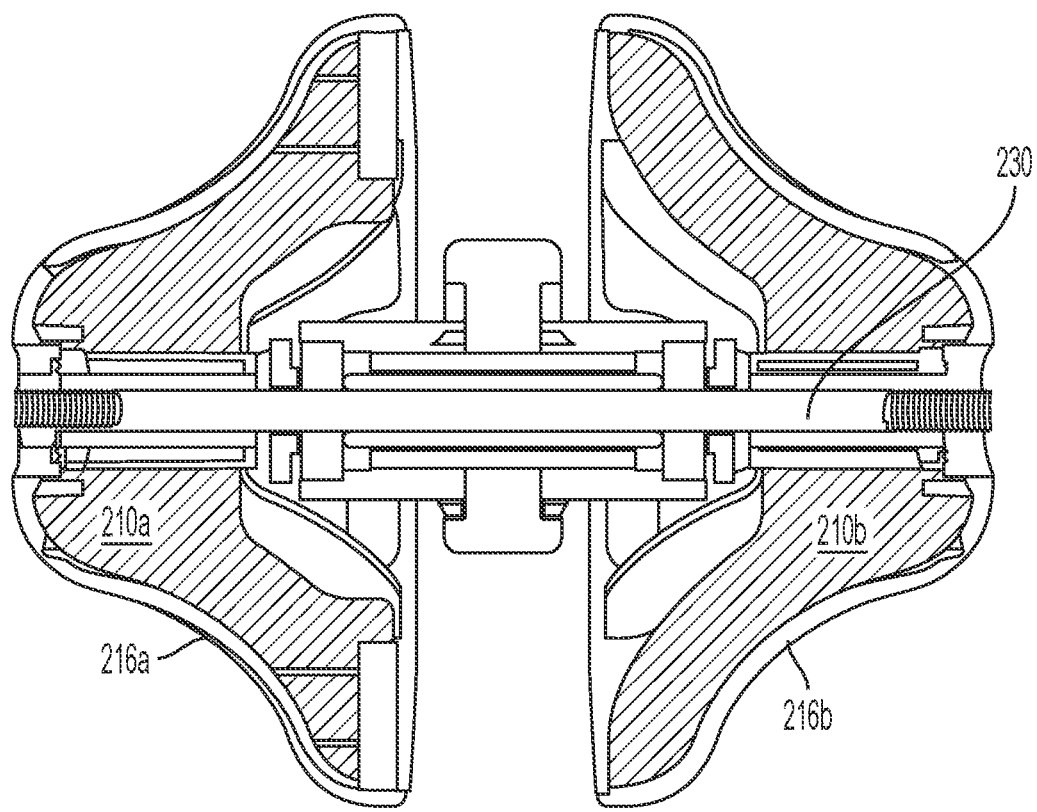

With reference to FIGS. 6C-6D, the mount body 228 comprises an elongate aperture 229 for receiving the spindle 226, and an aperture 231 for receiving the axle 230. In some embodiments, the elongate aperture 229 and the aperture 231 are offset from one another (as best seen in FIG. 6C). In some embodiments, the mount body 228 comprises a generally kidney-shaped form, having an elongate top portion which curves into a rounded bottom portion.

In some embodiments, the mount body 228 further comprises a projection 232a, 232b extending perpendicularly from the mount body 228 along axis A. In some embodiments, the mount body 228 and the projections 232a, 232b are one piece. In other embodiments, the mount body 228 is formed separately from the projections 232a, 232b, wherein the mount body 228 and the projections 232a, 232b are attached or fixedly-attached to each other. Each projection 232a, 232b is shaped to be received by the inner portion of the mounting disc projection 225.

Figure 7A:
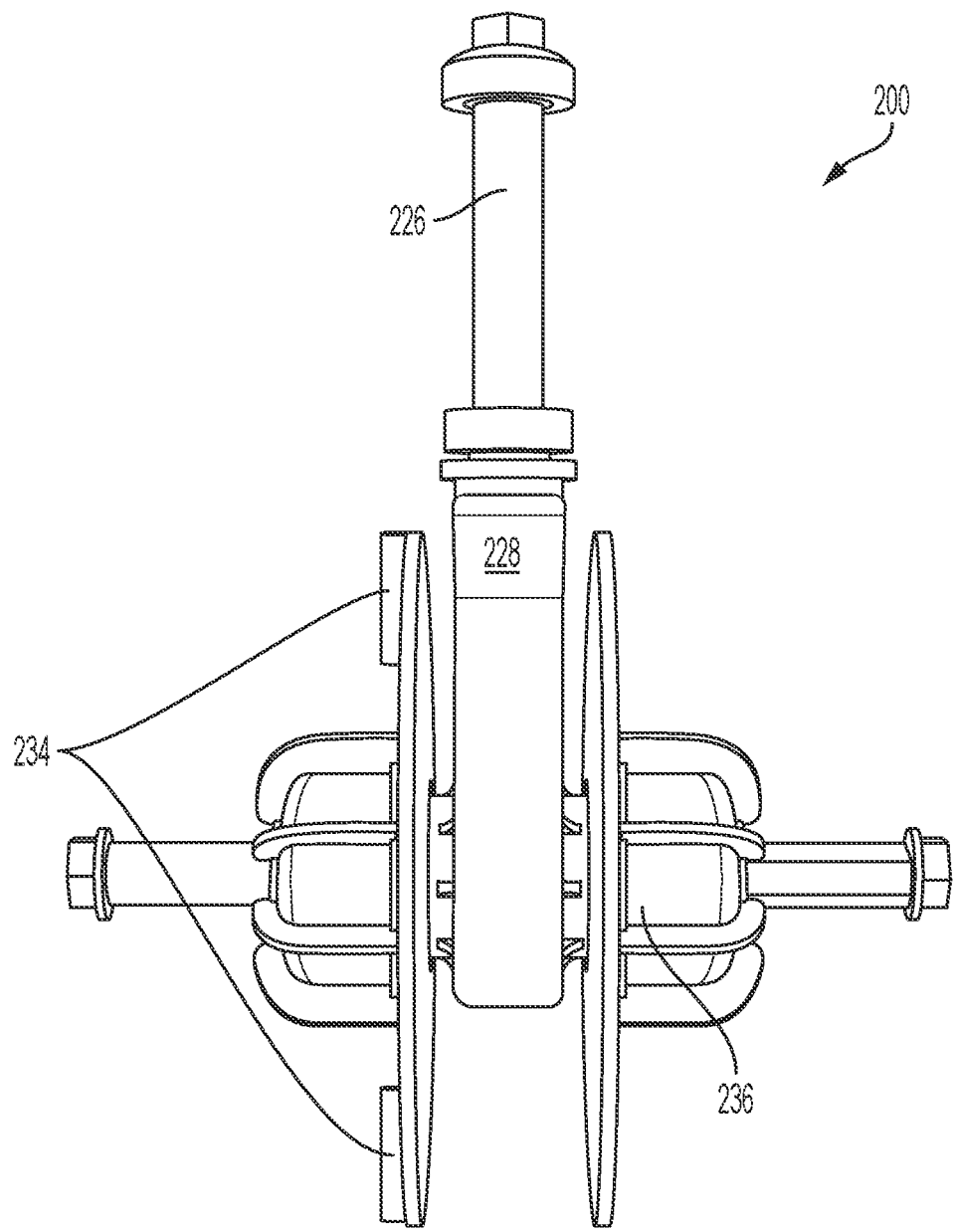
FIGS. 7A-7C illustrate an example caster wheel assembly for an outdoor power equipment machine, according to aspects of the disclosed technology.
Figure 7B:
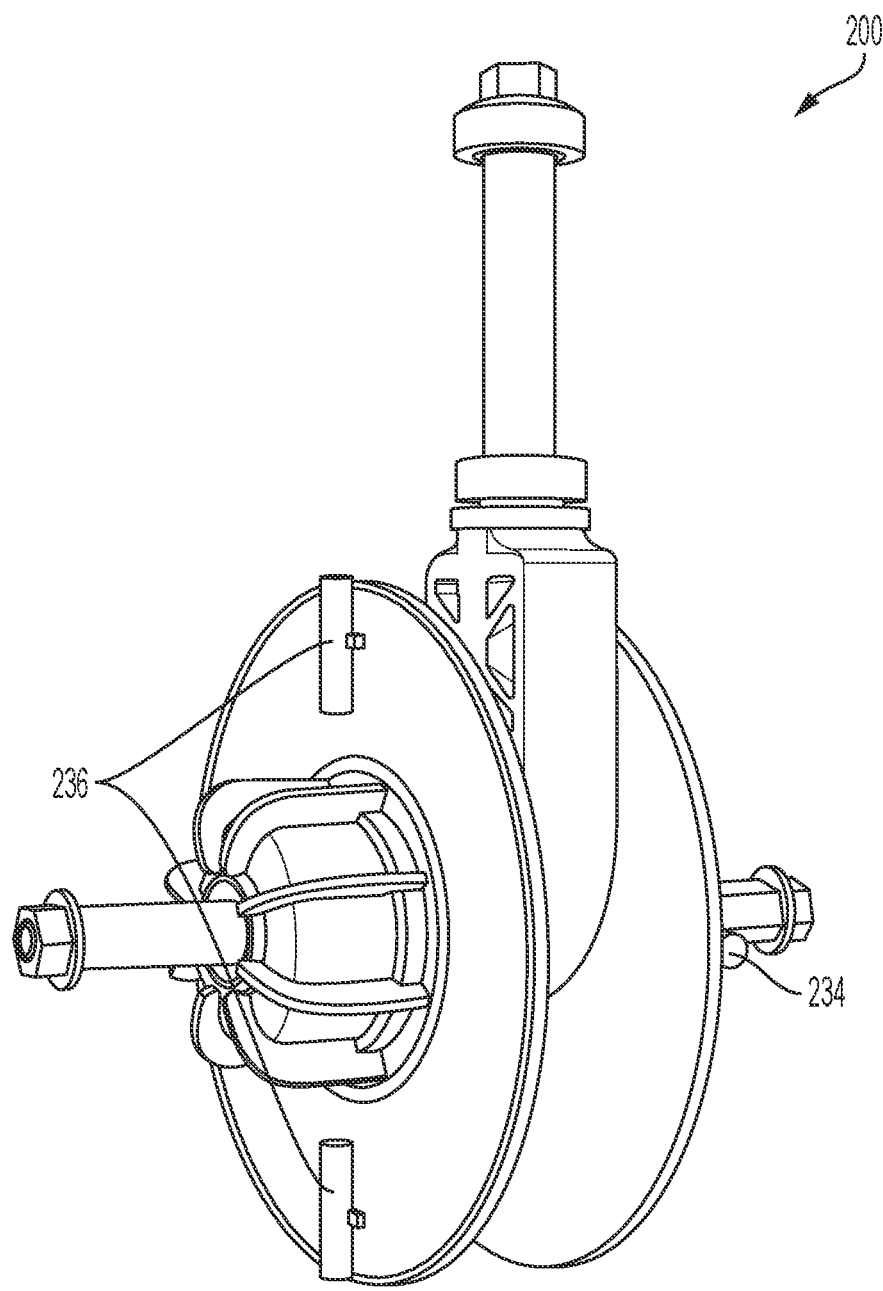
Figure 7C:
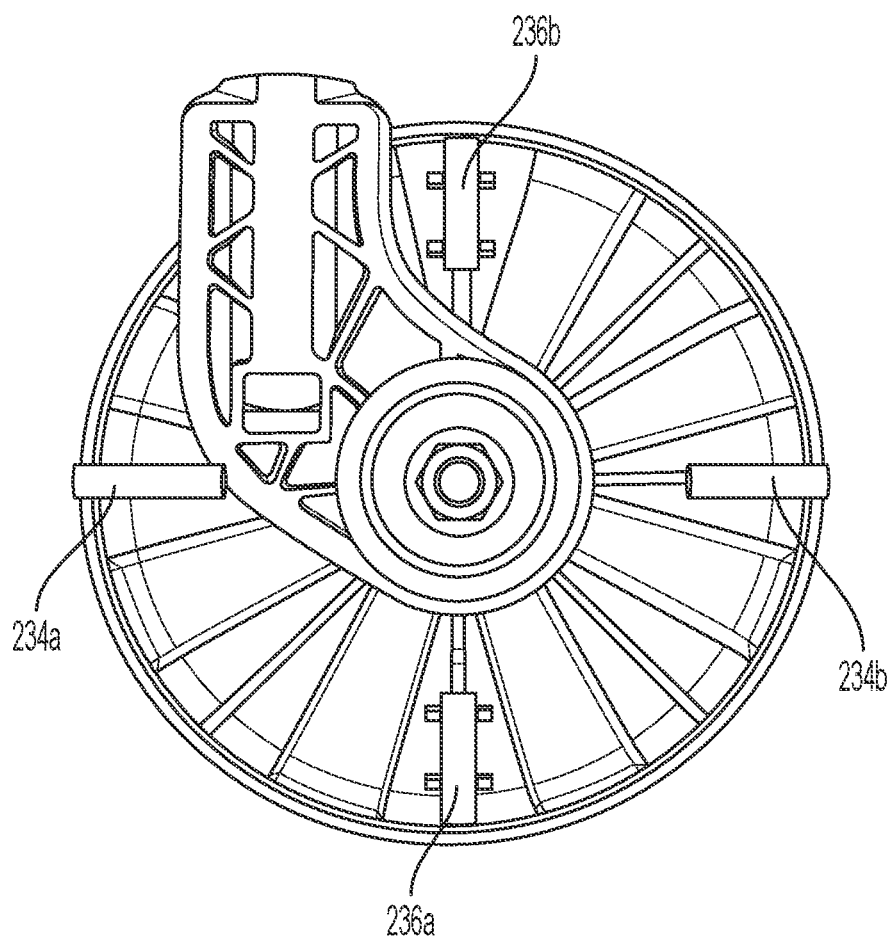

Now turning to FIGS. 7A-7C, in some embodiments, the caster wheel assembly 200 further provides for a position encoder including first magnet pair 234 and a second magnet pair 236, located within each respective bell-shaped half 210a, 210b. The presence of the first magnet pair 234 and the second magnet pair 236 provide the autonomous mower with the ability to sense the rotation, or lack thereof, of the caster wheel 210. The position encoder can further include a magnetic sensing device (not shown in the figures), which can be located within the chassis or frame of the autonomous mower, and is operative to detect changes in the magnetic field as each magnet of the first magnet pair 234 and the second magnet pair 236 pass over it.

In an embodiment, the position encoder associated with the caster wheel assembly 200 is arranged to measure the movement, rotation, velocity or displacement of the caster wheel 210. The magnetic sensing device may comprise a magnetic field sensor (e.g., Hall effect sensor), a magneto-resistive sensor, or another sensor that can sense or measure movement of the caster wheel 210. The position encoder can also provide information for determining that the caster wheel 210 is stationary, or rotating at an unexpectedly increased or decreased speed, indicating that the mower is stuck.

In further embodiments, the caster wheel assembly 200 can include components for sensing, measuring, and tracking wheel movement and position information, for example, components associated with incremental, absolute, magnetic, and/or optical rotary encoders.

In some embodiments, the alignment of first magnet pair 234 and the alignment of the second magnet pair 236 are offset from each other, such that each bell-shaped half 210a, 210b is in a clocked orientation at 90° from the corresponding bell-shaped half 210a, 210b (as best seen in FIG. 7C). In an embodiment, each end of the axle 230 can include a D-shaped portion corresponding to a similar D-shaped portion of each wheel half 210a, 210b, and which when assembled positions the wheel halves 210a, 210b such the first magnet pair 234 and the second magnet pair 236 are offset from each other.

In some embodiments, the first magnet pair 234 and the second magnet pair 236 are securely fastened onto the mounting disc 223. In some embodiments, the first magnet pair 234 comprises two individual magnets 234a and 234b, wherein magnet 234a is positioned directly opposite to magnet 234b (i.e. the magnets 234a and 234b are positioned 180° from each other), (see FIG. 7B). In some embodiments, the second magnet pair 236 comprises two individual magnets 236a, 236b, wherein magnet 236a is positioned directly opposite to magnet 236b (i.e. the magnets 236a and 236b are positioned 180° from each other).

While embodiments of the disclosed technology have been described, it should be understood that the present disclosure is not so limited, and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A caster wheel assembly, comprising:
a double bell-shaped caster wheel comprising two bell-shaped halves, wherein each bell-shaped half comprises a central hub, a smooth transition portion, an outer circumferential rim, and a planar face;
a wheel mount;
wherein the wheel mount further comprises a spindle, a mount body having a first elongate aperture receiving the spindle and a second aperture receiving an axle, and wherein the mount body is positioned between the bell-shaped halves;
wherein each bell-shaped half is described by a surface of revolution defined by a generatrix curve and an axis of revolution corresponding to the axle; and
wherein the generatrix curve has two distinct convex regions and one concave region relative to the axis of revolution.

2. The caster wheel assembly as recited in claim 1, wherein the planar faces are positioned facing toward each other to form the double bell-shaped caster wheel.

3. The caster wheel assembly as recited in claim 1, wherein each bell-shaped half has a smaller diameter, and a larger diameter.

4. The caster wheel assembly as recited in claim 3, wherein the smaller diameter is between 15 mm and 50 mm, and the larger diameter is between 80 mm to 150 mm.

5. The caster wheel assembly as recited in claim 1, wherein the caster wheel comprises four magnets positioned in a first of the two bell-shaped halves, and arranged around the outer circumferential rim of the first of the two bell-shaped halves.

6. A caster wheel assembly, comprising:
a double bell-shaped caster wheel comprising two bell-shaped halves, wherein each bell-shaped half comprises a central hub, a smooth transition portion, an outer circumferential rim, and a planar face;
a wheel mount;
wherein the wheel mount further comprises a spindle, a mount body having a first elongate aperture receiving the spindle and a second aperture receiving an axle, the axle rotatably engaged with the central hub of each bell-shaped half;
wherein the outer circumferential rim of each bell-shaped half comprises a limited surface area ground contacting portion;
wherein each bell-shaped half is described by a surface of revolution defined by a generatrix curve an axis of revolution corresponding to the axle; and
wherein the generatrix curve has two distinct convex regions and one concave region relative to the axis of revolution.

7. The caster wheel assembly as recited in claim 6, wherein the limited surface area ground contacting portions of the bell-shaped halves are spaced apart from each other.

8. The caster wheel assembly as recited in claim 7, wherein the planar faces are positioned adjacent to and facing toward each other to form the double bell-shaped caster wheel.

9. The caster wheel assembly as recited in claim 7, wherein each bell-shaped half has a smaller diameter, and a larger diameter.

10. The caster wheel assembly as recited in claim 9, wherein the smaller diameter is between 15 mm and 50 mm, and the larger diameter is between 80 mm and 150 mm.

11. The caster wheel assembly as recited in claim 7, wherein the caster wheel comprises four magnets positioned in a first of the two bell-shaped halves, and arranged around the outer circumferential rim of the first of the two bell-shaped halves.

12. The caster wheel assembly as recited in claim 6, wherein a width of the limited surface area ground contacting portions of the bell-shaped halves is 5 mm-20 mm.

13. A caster wheel assembly, comprising:
a first bell-shaped half having a first central hub, a first smooth transition portion, a first outer circumferential rim, and a first planar face;
a second bell-shaped half having a second central hub, a second smooth transition portion, a second outer circumferential rim, and a second planar face;
a wheel mount having a spindle, a mount body having an elongated first mount aperture receiving the spindle and a second mount aperture receiving an axle;
wherein the mount body is positioned between the first planar face and the second planar face;
wherein each bell-shaped half is described by a surface of revolution defined by a generatrix curve an axis of revolution corresponding to the axle; and
wherein the generatrix curve has two distinct convex regions and one concave region relative to the axis of revolution.

14. The caster wheel assembly as recited in claim 13, wherein the first planar face and the second planar face are positioned facing toward each other.

15. The caster wheel assembly as recited in claim 14, wherein the first bell-shaped half has a smaller diameter of the first bell-shaped half, and a larger diameter of the first bell-shaped half.

16. The caster wheel assembly as recited in claim 15, wherein the smaller diameter of the first bell-shaped half is between 15 mm and 50 mm.

17. The caster wheel assembly as recited in claim 15, wherein the larger diameter of the first bell-shaped half is between 80 mm to 150 mm.

* * * * *